Dec. 6, 1932.  A. ALTIERI  1,889,766
SAFETY DEVICE FOR AIRPLANES
Filed Aug. 25, 1931
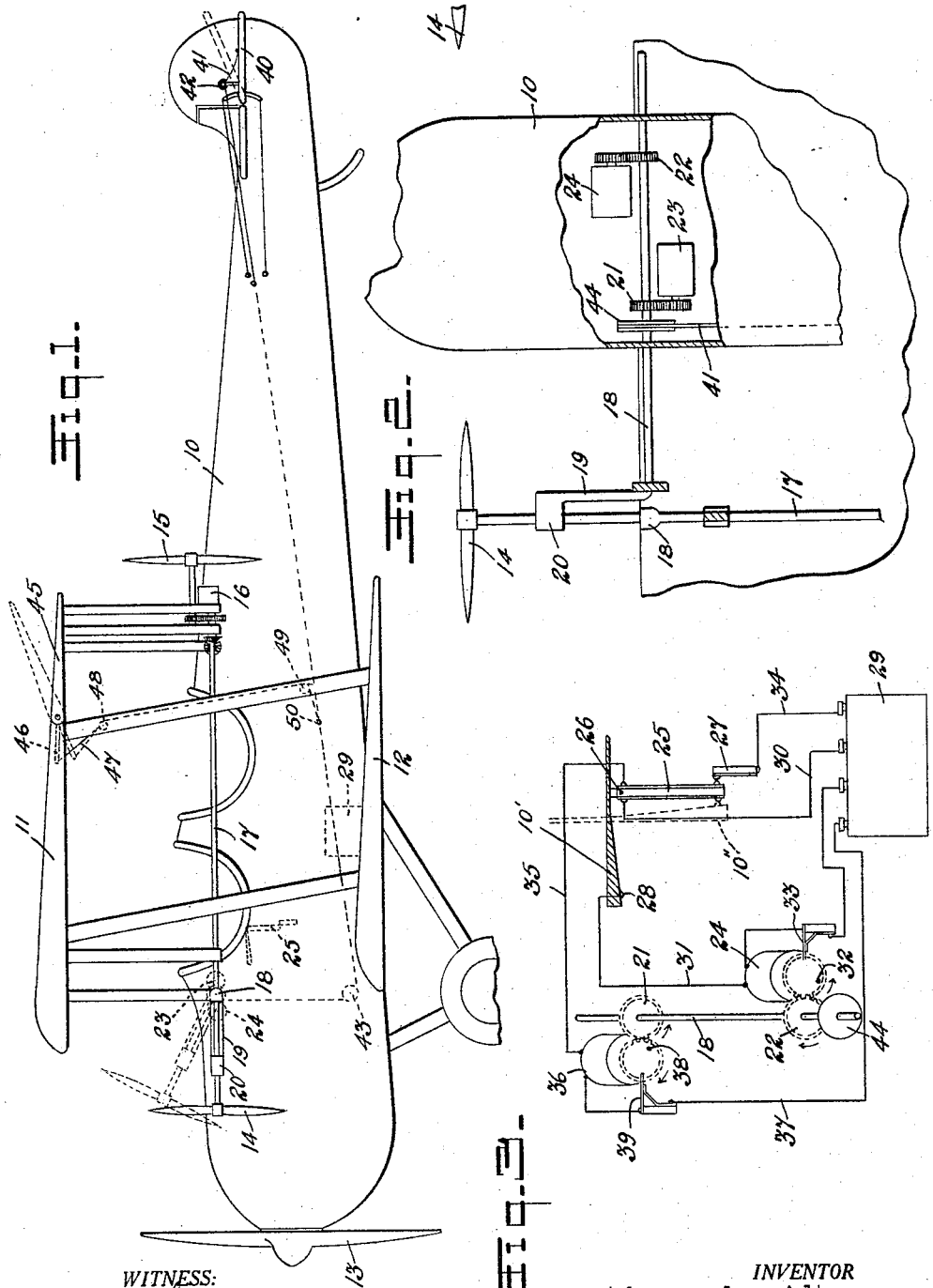
INVENTOR
Alexander Altieri
BY
Joshua R. H. Potts
HIS ATTORNEY
WITNESS:

Patented Dec. 6, 1932

1,889,766

UNITED STATES PATENT OFFICE

ALEXANDER ALTIERI, OF PHILADELPHIA, PENNSYLVANIA

SAFETY DEVICE FOR AIRPLANES

Application filed August 25, 1931. Serial No. 559,159.

This invention relates to safety devices for airplanes, and has for an object improved means for automatically positioning an auxiliary propeller to lift the nose of an airplane when such airplane has gone into a nose dive.

A further object of the invention is to provide improved automatic means for adjusting the elevator and ailerons for the purpose of righting an airplane when it has gone into a nose dive.

A further object of the invention is to provide improved electrical installation for controlling the adjustment of the auxiliary propeller, the elevator and ailerons.

The invention therefore comprises one or more auxiliary propellers with or without independent driving means arranged to be tilted upwardly relative to the fuselage with or without the additional arrangement of automatic means for controlling said tilting and simultaneously tilting the elevator and ailerons to positions for assisting in righting the plane.

The drawing illustrates an embodiment of the invention, and the views therein are as follows:

Figure 1 is a view in side elevation of a conventional airplane showing the auxiliary propellers, aileron and elevator in normal full lines, and in dotted lines, the positions automatically assumed to right the plane from a nose dive, Figure 2 is a fragmentary top plan view showing an arrangement of the motors and tilting device, and Figure 3 is a diagrammatic view of the electrical installation.

Like characters of reference indicate corresponding parts throughout the several views.

The airplane shown conventionally at 10, may be of any type preferred, and the showing of upper wings 11 and lower wings 12 constituting a biplane, is no limitation upon the invention.

The craft is provided with a tractor propeller 13 of the usual type and with forward auxiliary propellers 14 of the type disclosed in applicant's prior application, Serial No. 531,020, filed April 18, 1931, and application Serial No. 460,138, filed June 10, 1930 in which this applicant is a joint applicant. The craft is provided with rear auxiliary propellers 15 as disclosed in said two applications, and may employ merely air currents for actuating as disclosed in said application, No. 460,138, are provided with a "starter" type motor 16 as disclosed in said application No. 531,020. In any event, the rear propellers 15 are connected with the forward propellers 14 by means of shafts 17, and the shafts are provided with universal joints 18 as in said application No. 531,020.

In said last mentioned application, the tilting of the section of the propeller shaft forward of the universal joint was accomplished manually. In the present application, such tilting is accomplished automatically. To carry out this automatic tilting, a shaft 18 is provided extending transversely across the fuselage, carrying an arm 19, having a bearing 20 journaling the forward end of the shaft. When the shaft 18 is oscillated, the propellers 14 will be tilted as for instance, to the dotted line position shown at Figure 1.

To tilt these propellers automatically, the shaft 18 is provided with gears 21 and 22 with motors 23 and 24 intergeared with said gears. The energizing of these motors 23 and 24 will oscillate the shaft 18 in opposite directions. For the purpose of energizing these motors automatically, a pendulum 25 is mounted in any convenient part of the fuselage and pivoted upon a pivot 26. In the normal position of the fuselage, this pendulum switch 25 will hang vertically so that it is in engagement with the contact member 27. When the fuselage tilts, as for instance, in going into a nose dive so that the section 10', shown at Figure 3, will swing to the dotted line position 10'', the pendulum 25 will engage the contact 28.

As shown at Figure 3, these contacts 27 and 28 are spaced relative to the pivot 26 at substantially 90°. It is obvious, of course, that any different angle may be chosen. When the fuselage assumes the position indicated in dotted lines at 10'', the pendulum 25, still hanging vertically, will engage the contact 26 and close the circuit from the battery 29 through the wire 30 to the pendulum switch 25, and from the pendulum switch 25 to the contact 28 then in dotted line position, through the wire 31 to the motor 24, energizing the motor which will oscillate the shaft 18 to raise the auxiliary propellers 14 to dotted line position as shown at Figure 1. When the motor has made such rotation, as will affect this tilting, the pin 32, carried by the motor, will engage the switch 33 and break the circuit. The propellers will, therefore, remain at this dotted position until further acted upon. When the plane has been righted to its normal position, through the assistance of the auxiliary propellers in such tilted relation, the pendulum switch 25 will again engage the contact 27, and through the wire 34 close the circuit from battery to the wire 35 to the motor 36, returning through the wire 37. When this motor 36 is energized, it will rotate the shaft 18 in the opposite direction, returning the auxiliary propellers to normal or full line positions as shown at Figure 1.

When this position has been assumed, the pin 38, carried by the motor 36, will engage the switch 39 to open this circuit so that current will be used only during the period of actuation of the motors.

It is perfectly obvious that a reversing type of motor might be substituted for one of these motors, and the other motor eliminated. This, however, is fully within the knowledge of one skilled in the art.

In addition to the tilting of the auxiliary propellers, the elevator 40 may have connected thereto, a cable 41 which extends over a pulley 42 and extending forwardly in the fuselage over an idler pulley 43 is carried upon a drum 44 upon the shaft 18. To provide for the manual actuation of the elevator 40, slack is provided normally in the cable 41 so that when the auxiliary propellers have been returned to normal position, the unwinding of the cable 41 from the drum will provide a slackness therein enabling the pilot to control the elevator in the usual manner.

Additionally also, the ailerons 45 may be provided with arms 46 to which is connected an auxiliary cable 47 passing over idler pulleys 48 and 49 and controlled by the same drum 44 in any approved manner as by attaching the cable 47 to the cable 41 at 50.

It will be obvious that any of these various safety devices thus controlled from the swinging of the pendulum switch 25 may be eliminated, retaining only such as may be found necessary or desirable. For instance, the control may actuate any one of these instrumentalities or two, or all three as may be found desirable, and the automatic control will be equivalent in each of said cases.

It is believed that the operation of the device has been sufficiently described in the description of the structure, so that further description would be surplusage.

Of course, the safety device for airplanes, herein illustrated, may be modified in various ways without departing from the invention herein set forth and hereafter claimed.

The invention is hereby claimed as follows:

1. The combination with an airplane comprising a body, a propeller having a fixed orbit, a gravity controlled switch mounted upon said body, a wind actuated propeller mounted upon said body and adapted to be tilted from normal, a motor adapted to tilt said propeller, and a circuit including said gravity controlled switch for energizing the motor.

2. A safety device for airplanes comprising a body, a propeller having a fixed orbit, a gravity controlled switch mounted upon said body, a shaft journaled upon said body and provided with a universal joint, a wind actuated propeller carried by said shaft, an arm for moving a section of said shaft accommodated by said universal joint, a motor for actuating said shaft, and a circuit including said gravity controlled switch for energizing the motor.

3. The combination with an airplane comprising a body, an elevator hingedly connected with said body, a motor mounted upon said body, a winding drum controlled by said motor, a cable extending from said winding drum to tilt said elevator, said parts being arranged to provide slack in the cable when in normal position.

4. The combination with an airplane comprising a body, a propeller, a shaft journaled upon the body and provided with a universal joint, an auxiliary propeller carried by said shaft and tiltable by employing said universal joint, an elevator carried by said body, a motor mounted upon the body, a pendulum switch mounted upon the body, a circuit including said switch for energizing the motor, means transmitting power from said motor to tilt said auxiliary propeller, means transmitting power from said motor to tilt said elevator, and means to automatically return the auxiliary propeller and elevator to normal.

5. The combination with an airplane comprising a body and wings, an aileron forming a hingedly connected part of one of said wings, a shaft journaled upon the body and provided with a universal joint, a propeller carried by said shaft, an arm fulcrumed upon the body adapted to tilt said propeller by the employment of said universal joint, a motor mounted upon said body, means transmitting power from said motor to said tilting arm, and means transmitting power from said motor to tilt said aileron.

6. The combination with an airplane comprising a body and wings, an aileron forming a part of one of said wings, an elevator mounted upon said body, a shaft journaled upon said body and provided with a universal joint, an arm fulcrumed upon the body tending to tilt a section of said shaft, a propeller carried by said tiltable section, a motor mounted upon said body, means transmitting power from said motor to said tilting arm, means transmitting power from said motor to tilt said aileron, and means transmitting power from said motor to tilt the elevator.

7. The combination with an airplane comprising a body and wings, an aileron forming a tiltable part of one of said wings, an elevator hinged to said body, a shaft journaled upon said body and provided with a universal joint, an arm fulcrumed upon the body tending to tilt the section of said shaft accommodated by said universal joint, a propeller carried by said tiltable section, a motor mounted upon the body, means transmitting power from said motor to tilt said arm, means transmitting power from said motor to tilt said aileron, means transmitting power from said motor to tilt the elevator, a gravity controlled switch mounted upon said body, and a circuit including said switch controlling said motor.

In testimony whereof I have signed my name to this specification.

ALEXANDER ALTIERI.